3,258,457
3,20-DIHALOACETOXY PREGNANES AND PROCESS FOR THE PRODUCTION THEREOF
Fred A. Kincl, Atherton, Calif., assignor to Syntex Corporation, Panama, Panama, a corporation of Panama
No Drawing. Filed Oct. 4, 1963, Ser. No. 313,770
20 Claims. (Cl. 260—239.55)

This invention relates to novel cyclopentanopolyhydrophenanthrene derivatives and to processes for their preparation.

More particularly, this invention relates to novel 21-dihaloacetate esters of 21-hydroxypregnane derivatives such as those compounds represented by the general formula:

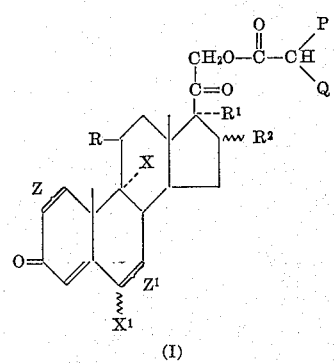

(I)

In the above formula R represents hydrogen, β-hydroxyl or a keto group; $R^1$ represents hydrogen or a hydroxyl group; $R^2$ represents hydrogen, α-methyl, β-methyl, α-hydroxyl or an α-acyloxy group containing less than 12 carbon atoms; $R^1$ and $R^2$ taken together can also represent the grouping:

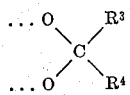

wherein $R^3$ and $R^4$ can each represent hydrogen, a lower alkyl (including cycloalkyl) group containing up to 10 carbon atoms, such as methyl, ethyl, propyl, isobutyl, cyclobutyl, cyclopentyl, cyclohexyl, cyclodecyl, and the like, a monocyclic aryl hydrocarbon (including alkaryl and aralkyl) group containing up to 10 carbon atoms, such as phenyl, benzyl, dimethylbenzyl, methylethylbenzyl, and the like, or a monocyclic heterocyclic group, such as furfuryl, thiophenyl, and the like; X represents hydrogen, fluorine or chlorine, with X being hydrogen when R is hydrogen; $X^1$ represents hydrogen, methyl, fluorine or chlorine, all of which can be in either the α- or the β-configuration when there is a saturated linkage between the carbon atoms and the 6- and 7-positions; Z represents either a double bond or a saturated linkage between the carbon atoms at the 1- and 2-positions; $Z^1$ represents either a double bond or a saturated linkage between the carbon atoms at the 6- and 7-positions, and P and Q each represent either fluorine or chlorine.

The conventional acyloxy groups which can be present at the 16α-position of the novel 21-dihaloacetoxy pregnane derivatives of the present invention are derived from hydrocarbon carboxylic acids containing less than 12 carbon atoms. These acids can be saturated or unsaturated, straight, branched, cyclic or cyclicaliphatic, and can also be either unsubstituted or subsituted, e.g., with hydroxyl groups, alkoxy groups containing up to 5 carbon atoms, acyloxy groups containing up to 12 carbon atoms, a nitro group, an amino group, a halogen atom, and the like. Included among such ester groups are the acetate, t-butylacetate, trimethylacetate, aminoacetate, phenoxyacetate, propionate, cyclopentylpropionate, β-chloropropionate, enanthate, benzoate, and the like. Of course, the acyloxy group at the 16α-position in the novel 21-dihaloacetoxypregnane derivatives of the present invention can also be a dihaloacetoxy group wherein the halogen atoms are either fluorine or chlorine, which can be introduced in the same manner as the dihaloacetoxy group at the 21-position.

Compounds such as those represented by Formula I above are prepared by simply esterifying the free 21-hydroxyl group in known 21-hydroxypregnane derivatives such as those represented by the general formula:

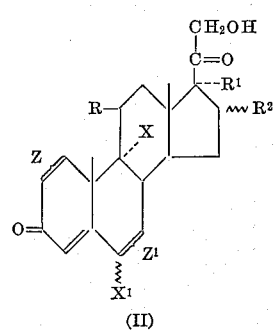

(II)

wherein R, $R^1$, $R^2$, X, $X^1$, Z and $Z^1$ have the same meaning as set forth hereinabove for Formula I, with a dihaloacetic acid, a dihaloacetyl halide or a dihaloacetic anhydride wherein the halogen atoms attached to the acetyl moiety are either fluorine or chlorine.

The present invention is based on the surprising and unexpected discovery that esterification of the 21-hydroxyl group in these known 21-hydroxy corticoids with the above-described dihaloacetyl groups potentiates their corticoid activity, thus permitting them to be used therapeutically at lower dosage levels at which the corresponding conventional 21-esters, e.g., the acetates, are no longer sufficiently active.

The esterification reaction, as periodically indicated, can be carried out using either a free dihaloacetic acid, i.e. dichloroacetic acid, difluoroacetic acid or fluorochloroacetic acid, a corresponding acid halide, preferably the chloride, e.g., dichloroacetyl chloride and the like, or a dihaloacetic anhydride, e.g., dichloroacetic anhydride and the like. Several esterification procedures, all of which have previously been used in conventionally esterifying steroidal hydroxyl groups, can be followed. First of all, esterification can be carried out in an inert organic solvent, preferably pyridine, collidine, lutidine, and the like, as well as mixtures thereof with each other or with one or more other inert organic solvents, such as benzene, toluene, xylene, and the like, at a temperature ranging from room temperature (about 25° C.) or lower to about 115° C. for from about 30 minutes to about 15 hours or longer, using either a dihaloacetyl halide or a dihaloacetic anhydride. Secondly, esterification can also be accomplished in an inert organic solvent, such as benzene, toluene, xylene and the like, as well as mixtures thereof, in the absence of pyridine and the like, by using a free dihaloacetic acid of the anhydride thereof either alone or in the presence of a strongly acidic esterification catalyst, such as benzenesulfonic acid, p-toluenesulfonic acid, and the like. This latter esterification procedure will generally be carried out at reflux temperature for periods of time ranging up to 15 hours or more, with provision being made for the continual removal of water formed during the reaction.

In working up the reaction mixtures obtained using the first of the above-described procedures, the reaction mixture is usually washed first with dilute aqueous hydrochloric acid and then with an aqueous solution of sodium carbonate, while in working up the reaction mixtures obtained using the second of these procedures, the hydrochloric acid wash is omitted. In either case, however, conventional evaporation, drying, crystallization and/or chromatography techniques can be employed to isolate the final product.

Wherever necessary, 21-acyloxypregnanes which have been esterified at the 21-position with conventional acyl groups, e.g., acetates, propionates, enanthates and the like, can be deesterified by conventional procedures, e.g., by refluxing them with aqueous sodium hydroxide, potassium carbonate, and the like, in order to provide a free-21-hydroxyl group which can then be reesterified with a dihaloacetyl group as described hereinabove.

An illustrative but by no means exhaustive listing of 21-hydroxypregnane derivatives coming within the scope of Formula II above which can be esterified according to the practice of the present invention includes:

$\Delta^4$-pregnen-21-ol-3,20-dione,
$\Delta^4$-pregnene-16$\alpha$,21-diol-3,20-dione,
$\Delta^{1,4}$-pregnadien-21-ol-3,20-dione,
6$\alpha$-methyl-$\Delta^4$-pregnene-17$\alpha$,21-diol-3,20-dione,
6$\alpha$-fluoro-$\Delta^4$-pregnene-17$\alpha$,21-diol-3,20-dione,
6$\alpha$-chloro-$\Delta^4$-pregnene-17$\alpha$,21-diol-3,20-dione,
6$\alpha$-fluoro-$\Delta^{1,4}$-pregnadiene-17$\alpha$,21-diol-3,20-dione,
6$\alpha$-chloro-$\Delta^{1,4}$-pregnadiene-17$\alpha$,21-diol-3,20-dione,
6$\alpha$-chloro-$\Delta^{4,6}$-pregnadiene-17$\alpha$,21-diol-3,20-dione,
6$\alpha$-chloro-$\Delta^{1,4,6}$-pregnatriene-17$\alpha$,21-diol-3,20-dione,
$\Delta^4$-pregnen-21-ol-3,11,20-trione,
6$\alpha$-fluoro-$\Delta^4$-pregnen-21-ol-3,11,20-trione,
9$\alpha$-fluoro-$\Delta^4$-pregnen-21-ol-3,11,20-trione,
9$\alpha$-chloro-$\Delta^4$-pregnen-21-ol-3,11,20-trione,
6$\alpha$,9$\alpha$-difluoro-$\Delta^4$-pregnen-21-ol-3,11,20-trione,
6$\alpha$,9$\alpha$-difluoro-$\Delta^{1,4}$-pregnadien-21-ol-3,11,20-trione,
$\Delta^4$-pregnene-11$\beta$,21-diol-3,20-dione,
6$\alpha$-methyl-$\Delta^4$-pregnene-11$\beta$,21-diol-3,20-dione,
6$\alpha$-fluoro-$\Delta^4$-pregnene-11$\beta$,21-diol-3,20-dione,
9$\alpha$-fluoro-$\Delta^4$-pregnene-11$\beta$,21-diol-3,20-dione,
9$\alpha$-chloro-$\Delta^4$-pregnene-11$\beta$,21-diol-3,20-dione,
6$\alpha$,9$\alpha$-difluoro-$\Delta^4$-pregnene-11$\beta$,21-diol-3,20-dione,
$\Delta^{1,4}$-pregnadiene-11$\beta$,21-diol-3,20-dione,
9$\alpha$-fluoro-$\Delta^{1,4}$-pregnadiene-11$\beta$,21-diol-3,20-dione,
6$\alpha$,9$\alpha$-difluoro-$\Delta^{1,4}$-pregnadiene-11$\beta$,21-diol-3,20-dione,
$\Delta^4$-pregnene-17$\alpha$,21-diol-3,11,20-trione,
6$\alpha$-methyl-$\Delta^4$-pregnene-17$\alpha$,21-diol-3,11,20-trione,
6$\beta$-methyl-$\Delta^4$-pregnene-17$\alpha$,21-diol-3,11,20-trione,
6$\alpha$-fluoro-$\Delta^4$-pregnene-17$\alpha$,21-diol-3,11,20-trione,
6$\alpha$-chloro-$\Delta^4$-pregnene-17$\alpha$,21-diol-3,11,20-trione,
6$\beta$-chloro-$\Delta^4$-pregnene-17$\alpha$,21-diol-3,11,20-trione,
6$\beta$,9$\alpha$-difluoro-$\Delta^4$-pregnene-17$\alpha$,21-diol-3,11,20-trione,
6$\alpha$-chloro-9$\alpha$-fluoro-$\Delta^4$-pregnene-17$\alpha$,21-diol-3,11,20-trione,
6$\beta$-chloro-9$\alpha$-fluoro-$\Delta^4$-pregnene-17$\alpha$,21-diol-3,11,20-trione,
$\Delta^4$-pregnene-16$\alpha$,17$\alpha$,21-triol-3,11,20-trione,
16$\alpha$,17$\alpha$-isopropylidenedioxy-$\Delta^4$-pregnen-21-ol-3,11,20-trione,
6$\alpha$-fluoro-$\Delta^4$-pregnene-16$\alpha$,17$\alpha$,21-triol-3,11,20-trione,
6$\alpha$,9$\alpha$-difluoro-$\Delta^4$-pregnene-16$\alpha$,17$\alpha$,21-triol-3,11,20-trione,
$\Delta^{1,4}$-pregnadiene-17$\alpha$,21-diol-3,11,20-trione,
6$\alpha$-methyl-$\Delta^{1,4}$-pregnadiene-17$\alpha$,21-diol-3,11,20-trione,
6$\beta$-methyl-$\Delta^{1,4}$-pregnadiene-17$\alpha$,21-diol-3,11,20-trione,
6$\alpha$-fluoro-$\Delta^{1,4}$-pregnadiene-17$\alpha$,21-diol-3,11,20-trione,
6$\alpha$-chloro-$\Delta^{1,4}$-pregnadiene-17$\alpha$,21-diol-3,11,20-trione,
6$\beta$-chloro-$\Delta^{1,4}$-pregnadiene-17$\alpha$,21-diol-3,11,20-trione,
9$\alpha$-fluoro-$\Delta^{1,4}$-pregnadiene-17$\alpha$,21-diol-3,11,20-trione,
9$\alpha$-chloro-$\Delta^{1,4}$-pregnadiene-17$\alpha$,21-diol-3,11,20-trione,
6$\alpha$-chloro-9$\alpha$-fluoro-$\Delta^{1,4}$-pregnadiene-17$\alpha$,21-diol-3,11,20-trione,
6$\alpha$-methyl-9$\alpha$-fluoro-$\Delta^{1,4}$-pregnadiene-17$\alpha$,21-diol-3,11,20-trione,
16$\alpha$-methyl-$\Delta^{1,4}$-pregnadiene-17$\alpha$,21-diol-3,11,20-trione,
16$\beta$-methyl-$\Delta^{1,4}$-pregnadiene-17$\alpha$,21-diol-3,11,20-trione,
$\Delta^{1,4}$-pregnadiene-16$\alpha$,17$\alpha$,21-triol-3,11,20-trione,
16$\alpha$,17$\alpha$-isopropylidenedioxy-$\Delta^{1,4}$-pregnadien-21-ol-3,11,20-trione,
6$\alpha$-fluoro-$\Delta^{1,4}$-pregnadiene-16$\alpha$,17$\alpha$,21-triol-3,11,20-trione,
9$\alpha$-fluoro-$\Delta^{1,4}$-pregnadiene-16$\alpha$,17$\alpha$,21-triol-3,11,20-trione,
6$\alpha$,9$\alpha$-difluoro-$\Delta^{1,4}$-pregnadiene-16$\alpha$,17$\alpha$,21-triol-3,11,20-trione,
$\Delta^{1,4,6}$-pregnatriene-17$\alpha$,21-diol-3,11,20-trione,
$\Delta^{1,4,6}$-pregnatriene-16$\alpha$,17$\alpha$,21-triol-3,11,20-trione,
9$\alpha$-fluoro-$\Delta^{1,4,6}$-pregnatriene-16$\alpha$,17$\alpha$,21-triol-3,11,20-trione,
$\Delta^4$-pregnene-11$\beta$,17$\alpha$,21-triol-3,20-dione,
6$\alpha$-fluoro-$\Delta^4$-pregnene-11$\beta$,17$\alpha$,21-triol-3,20-dione,
6$\beta$-fluoro-$\Delta^4$-pregnene-11$\beta$,17$\alpha$,21-triol-3,20-dione,
6$\alpha$-chloro-$\Delta^4$-pregnene-11$\beta$,17$\alpha$,21-triol-3,20-dione,
6$\alpha$-methyl-$\Delta^4$-pregnene-11$\beta$,17$\alpha$,21-triol-3,20-dione,
6$\beta$-methyl-$\Delta^4$-pregnene-11$\beta$,17$\alpha$,21-triol-3,20-dione,
16$\alpha$-methyl-$\Delta^4$-pregnene-11$\beta$,17$\alpha$,21-triol-3,20-dione,
16$\beta$-methyl-$\Delta^4$-pregnene-11$\beta$,17$\alpha$,21-triol-3,20-dione,
9$\alpha$-fluoro-$\Delta^4$-pregnene-11$\beta$,17$\alpha$,21-triol-3,20-dione,
9$\alpha$-chloro-$\Delta^4$-pregnene-11$\beta$,17$\alpha$,21-triol,3,20-dione,
16$\alpha$-hydroxy-$\Delta^4$-pregnene-11$\beta$,17$\alpha$,21-triol-3,20-dione,
6$\alpha$-methyl-9$\alpha$-fluoro-$\Delta^4$-pregnene-11$\beta$,17$\alpha$,21-triol-3,20-dione,
6$\alpha$,9$\alpha$-difluoro-$\Delta^4$-pregnene-11$\beta$,17$\alpha$,21-triol-3,20-dione,
6$\alpha$-chloro-9$\alpha$-fluoro-$\Delta^4$-pregnene-11$\beta$,17$\alpha$,21-triol-3,20-dione,
6$\beta$-chloro-9$\alpha$-fluoro-$\Delta^4$-pregnene-11$\beta$,17$\alpha$,21-triol-3,20-dione,
6$\alpha$-fluoro-16$\alpha$-methyl-$\Delta^4$-pregnene-11$\beta$,17$\alpha$,21-triol-3,20-dione,
6$\alpha$-fluoro-$\Delta^4$-pregnene-11$\beta$,16$\alpha$,17$\alpha$,21-tetrol-3,20-dione,
6$\alpha$-fluoro-16$\alpha$,17$\alpha$-isopropylidenedioxy-$\Delta^4$-pregnene-11$\beta$,21-diol-3,20-dione,
9$\alpha$-fluoro-16$\alpha$-methyl-$\Delta^4$-pregnene-11$\beta$,17$\alpha$,21-triol-3,20-dione,
9$\alpha$-fluoro-16$\alpha$-hydroxy-$\Delta^4$-pregnene-11$\beta$,17$\alpha$,21-triol-3,20-dione,
9$\alpha$-chloro-16$\alpha$-hydroxy-$\Delta^4$-pregnene-11$\beta$,17$\alpha$,21-triol-3,20-dione,
9$\alpha$-fluoro-16$\alpha$,17$\alpha$-isopropylidenedioxy-$\Delta^4$-pregnene-11$\beta$,21-diol-3,20-dione,
6$\alpha$,9$\alpha$-difluoro-16$\alpha$-methyl-$\Delta^4$-pregnene-11$\beta$,17$\alpha$,21-triol-3,20-dione,
6$\alpha$,9$\alpha$-difluoro-$\Delta^4$-pregnene-11$\beta$,16$\alpha$,17$\alpha$,21-tetrol-3,20-dione,
6$\alpha$,9$\alpha$-difluoro-16$\alpha$,17$\alpha$-isopropylidenedioxy-$\Delta^4$-pregnene-11$\beta$,21-diol-3,20-dione,
9$\alpha$-fluoro-$\Delta^{4,6}$-pregnadiene-11$\beta$,17$\alpha$,21-triol-3,20-dione,
$\Delta^{1,4}$-pregnadiene-11$\beta$,17$\alpha$,21-triol-3,20-dione,
6$\alpha$-methyl-$\Delta^{1,4}$-pregnadiene-11$\beta$,17$\alpha$,21-triol-3,20-dione,
6$\beta$-methyl-$\Delta^{1,4}$-pregnadiene-11$\beta$,17$\alpha$,21-triol-3,20-dione,
16$\alpha$-methyl-$\Delta^{1,4}$-pregnadiene-11$\beta$,17$\alpha$,21-triol-3,20-dione,
16$\beta$-methyl-$\Delta^{1,4}$-pregnadiene-11$\beta$,17$\alpha$,21-triol-3,20-dione,
6$\alpha$-fluoro-$\Delta^{1,4}$-pregnadiene-11$\beta$,17$\alpha$,21-triol-3,20-dione,
6$\alpha$-chloro-$\Delta^{1,4}$-pregnadiene-11$\beta$,17$\alpha$,21-triol-3,20-dione,
9$\alpha$-fluoro-$\Delta^{1,4}$-pregnadiene-11$\beta$,17$\alpha$,21-triol-3,20-dione,
9$\alpha$-chloro-$\Delta^{1,4}$-pregnadiene-11$\beta$,17$\alpha$,21-triol-3,20-dione,
6$\alpha$-methyl-9$\alpha$-fluoro-$\Delta^{1,4}$-pregnadiene-11$\beta$,17$\alpha$,21-triol-3,20-dione,
6$\alpha$-fluoro-16$\alpha$-methyl-$\Delta^{1,4}$-pregnadiene-11$\beta$,17$\alpha$,21-triol-3,20-dione,
6$\alpha$,9$\alpha$-difluoro-$\Delta^{1,4}$-pregnadiene-11$\beta$,17$\alpha$,21-triol-3,20-dione,
6$\alpha$-chloro-9$\alpha$-fluoro-$\Delta^{1,4}$-pregnadiene-11$\beta$,17$\alpha$,21-triol-3,20-dione,
6$\alpha$-fluoro-$\Delta^{1,4}$-pregnadiene-11$\beta$,16$\alpha$,17$\alpha$,21-tetrol-3,20-dione,
6$\alpha$-fluoro-16$\alpha$,17$\alpha$-isopropylidenedioxy-$\Delta^{1,4}$-pregnadiene-11$\beta$,21-diol-3,20-dione,
9$\alpha$-fluoro-16$\alpha$-methyl-$\Delta^{1,4}$-pregnadiene-11$\beta$,17$\alpha$,21-triol-3,20-dione,
9$\alpha$-fluoro-16$\beta$-methyl-$\Delta^{1,4}$-pregnadiene-11$\beta$,17$\alpha$,21-triol-3,20-dione, 9α - fluoro - Δ$^{1,4}$-pregnadiene-11β,16α,17α,21-tetrol-3,20-dione, 9α - fluoro-16α,17α-isopropylidenedioxy-Δ$^{1,4}$-pregnadiene-11β,21-diol-3,20-dione, 6α,9α - difluoro - 16α-methyl-Δ$^{1,4}$-pregnadiene-11β,17α,21-triol-3,20-dione, 6α,9α - difluoro-Δ$^{1,4}$ - pregnadiene - 11β,16α,17α,21-tetrol-3,20-dione, 6α,9α - difluoro - 16α,17α - isopropylidenedioxy - Δ$^{1,4}$-pregnadiene-11β,21-diol-3,20-dione, 6α,9α - difluoro - Δ$^{1,4}$ - pregnadiene-11β,16α,17α,21-tetrol-3,20-dione-16α,17α-acetal, 6α,9α - difluoro - Δ$^{1,4}$-pregnadiene - 11β,16α,17α,21-tetrol-3,20-dione methyl ethyl ketal, 6α,9α - difluoro - Δ$^{1,4}$ - pregnadiene-11β,16α,17α,21-tetrol-3,20-dione diethyl ketal, 6α,9α - difluoro - Δ$^{1,4}$ - pregnadiene-11β,16α,17α,21-tetrol-3,20-dione methyl isobutyl ketal, 6α,9α - difluoro - Δ$^{1,4}$ - pregnadiene-11β,16α,17α,21-tetrol-3,20-dione cyclohexylidene ketal, 6α,9α - difluoro - Δ$^{1,4}$ - pregnadiene-11β,16α,17α,21-tetrol-3,20-dione methyl phenyl ketal, 6α - chloro - 9α - fluoro-Δ$^{1,4}$-pregnadiene-11β,16α,17α,21-tetrol-3,20-dione, 6α - chloro - 9α - fluoro-16α,17α-isopropylidenedioxy-Δ$^{1,4}$-pregnadiene-11β,21-diol-3,20-dione, Δ$^{1,4,6}$-pregnatriene-11β,17α,21-triol-3,20-dione, 9α - fluoro - Δ$^{1,4,6}$ - pregnatriene-11β,17α,21-triol-3,20-dione, Δ$^{1,4,6}$-pregnatriene-11β,16α,17α,21-tetrol-3,20-dione, and the like, as well as, in the case of those 21-hydroxpregnanes containing hydroxyl groups at the 16α-position, the conventional acylates thereof, e.g., the acetates, propionates, enanthates, and the like.

In order that those skilled in the art can more fully understand the present invention, the following examples are set forth. These examples are given solely for the purpose of illustration, and should not be considered as expressing limitations unless so set forth in the appended claims.

Example I

A mixture of 1 gram of Δ$^4$-pregnene-17α,21-diol-3,11,20-trione, 2 grams of dichloroacetyl chloride and 4 cc. of pyridine was charged to a suitable reaction vessel and reacted overnight at room temperature (about 25° C.). Next, the reaction mixture was poured into ice water and the precipitate formed thereby was filtered, washed with water and dried. Crystallization of the dried precipitate from acetone-hexane resulted in a substantially quantitative yield of Δ$^4$-pregnene-17α,21-diol-3,11,20-trione 21-dichloroacetate.

Examples II and III

The procedure of Example I was repeated in every detail in each of these examples with one exception, namely, dichloroacetyl chloride was replaced by difluoroacetyl chloride and fluorochloroacetyl chloride, respectively. Substantially quantitative yields of the 21-difluoroacetate and 21-fluorochloroacetate of Δ$^4$-pregnene-17α,21-diol-3,11,20-trione, respectively, were obtained.

Examples IV–VI

By using Δ$^4$-pregnene-11β,17α,21-triol-3,20-dione in place of Δ$^4$-pregnene-17α,21-diol-3,11,20-trione in the procedure of Examples I, II and III, the 21-dichloroacetate, 21-difluoroacetate and 21-fluorochloroacetate, respectively, were obtained in substantially quantitative yields.

Examples VII–XV

The procedure of Example I was again repeated in every detail in each of these examples with the following exceptions. First of all, Δ$^4$-pregnene-17α,21-diol-3,11,20-trione was replaced by 6α - methyl - Δ$^4$ - pregnene-17α,21-diol-3,11,20-trione-6α-methyl-Δ$^4$-pregnene-11β,17α,21-triol-3,20-dione;

9α-fluoro-Δ$^4$-pregnene-17α,21-diol-3,11,20-trione;

9α-fluoro-Δ$^4$-pregnene-11β,17α,21-triol-3,20-dione;

16α,17α - isopropylidenedioxy - Δ$^4$-pregnen-21-ol-3,11,20-trione;

6α - chloro - 9α - fluoro-Δ$^{1,4}$-pregnadiene-17α,21-diol-3,11,20-trione;

6α,9α - difluoro - 16α,17α - isopropylidenedioxy-Δ$^{1,4}$-pregnadiene-11β,21-diol-3,20-dione;

6α - fluoro - 16α - methyl - Δ$^{1,4}$ - pregnadiene-11β,17α,21-triol-3,20-dione and 9α - fluoro - 16β-methyl-Δ$^{1,4}$-pregnadiene-11β,17α,21-triol-3,20-dione, respectively.

In addition, dichloroacetyl chloride was replaced in Examples VII–IX by difluoroacetyl chloride, fluorochloroacetyl chloride and dichloroacetic anhydride, respectively. This resulted in substantially quantitative yields of 6α - methyl - Δ$^4$ - pregnene-17α,21-diol-3,11,20-trione 21-difluoroacetate;

6α - methyl - Δ$^4$-pregnene-11β,17α,21-triol-3,20-dione 21-fluorochloroacetate and the 21-dichloroacetates of 9α-fluoro-Δ$^4$-pregnene-17α,21-diol-3,11,20-trione;

9α-fluoro-Δ$^4$-pregnene-11β,17α,21-triol-3,20-dione;

16α,17α - isopropylidenedioxy - Δ$^4$ - pregnen-21-ol-3,11,20-trione;

6α - chloro - 9α - fluoro-Δ$^{1,4}$-pregnadiene-17α,21-diol-3,11,20-trione;

6α,9α - difluoro - 16α,17α - isopropylidenedioxy-Δ$^{1,4}$-pregnadiene-11β,21-diol-3,20-dione;

6α - fluoro - 16α - methyl - Δ$^{1,4}$-pregnadiene-11β,17α,21-triol-3,20-dione and 9α - fluoro - 16β - methyl - Δ$^{1,4}$ - pregnadiene-11β,17α,21-triol-3,20-dione respectively.

It will be obvious to those skilled in the art that other changes and variations can be made in carrying out the present invention without departing from the spirit and scope thereof as defined in the appended claims.

I claim:

1. A 3,20-diketo-21-dihaloacetoxy-Δ$^4$-pregnene wherein the halogen atoms in said dihaloacetoxy group are selected from the group consisting of fluorine and chlorine.

2. A compound according to claim 1 wherein the dihaloacetoxy is dichloroacetoxy.

3. A compound according to claim 1 wherein the dihaloacetoxy is difluoroacetoxy.

4. A compound according to claim 1 wherein the dihaloacetoxy is fluorochloroacetoxy.

5. A compound represented by the general formula:

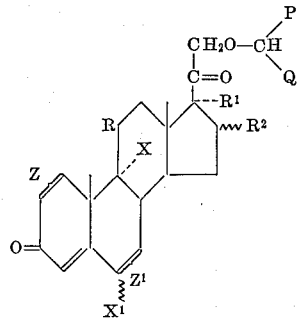

wherein R is selected from the group consisting of hydrogen, β-hydroxyl and a keto group; R$^1$ is selected from the group consisting of hydrogen and hydroxyl; R$^2$ is selected from the group consisting of hydrogen, α-methyl, β-methyl, α-hydroxyl and an acyloxy group containing less than 12 carbon atoms; R$^1$ and R$^2$ taken together represent the grouping:

wherein $R^3$ and $R^4$ are each selected from the group consisting of hydrogen, a lower alkyl group, an aryl hydrocarbon group and a heterocyclic group; X is selected from the group consisting of hydrogen, fluorine and chlorine, with X being hydrogen when R is hydrogen; $X^1$ is selected from the group consisting of hydrogen, methyl, fluorine and chlorine; Z and $Z^1$ are selected from the group consisting of a double bond and a saturated linkage between the carbon atoms at the 1- and 2- and 6- and 7-positions, respectively, and P and Q are each selected from the group consisting of fluorine and chlorine.

6. $\Delta^4$ - pregnene-17α,21-diol-3,11,20-trione-21-dichloroacetate.

7. $\Delta^4$ - pregnene-17α,21-diol-3,11,20-trione-21-difluoroacetate.

8. $\Delta^4$ - pregnene - 17α,21-diol-3,11,20-trione-21-fluorochloroacetate.

9. $\Delta^4$ - pregnene - 11β,17α,21-triol-3,20-dione-21-dichloroacetate.

10. $\Delta^4$ - pregnene - 11β,17α,21 - triol-3,20-dione-21-difluoroacetate.

11. $\Delta^4$ - pregnene-11β,17α,21-triol-3,20-dione-21-fluorochloroacetate.

12. 6α - methyl - $\Delta^4$ - pregnene-17α,21-diol-3,11,20-trione-21-difluoroacetate.

13. 6α - methyl - $\Delta^4$ - pregnene - 11β,17α,21-triol-3,20-dione-21-fluorochloroacetate.

14. 9α - fluoro - $\Delta^4$ - pregnene-17α,21-diol-3,11,20-trione-21-dichloroacetate.

15. 9α - fluoro - $\Delta^4$ - pregnene-11β,17α,21-triol-3,20-dione-21-dichloroacetate.

16. 16α,17α - isopropylidenedioxy - $\Delta^4$ - pregnen-21-ol-3,11,20-trione-21-dichloroacetate.

17. 6α - chloro - 9α - fluoro - $\Delta^{1,4}$-pregnadiene-17α,21-diol-3,11,20-trione-21-dichloroacetate.

18. 6α,9α - difluoro - 16α,17α-isopropylidenedioxy-$\Delta^{1,4}$-pregnadiene-11β,21-diol-3,20-dione-21-dichloroacetate.

19. 6α - fluoro - 16α - methyl-$\Delta^{1,4}$-pregnadiene-11β,17α,21-triol-3,20-dione-21-dichloroacetate.

20. 9α - fluoro - 16β - methyl-$\Delta^{1,4}$-pregnadiene-11β,17α,21-triol-3,20-dione-21-dichloroacetate.

References Cited by the Examiner
UNITED STATES PATENTS

| | | | |
|---|---|---|---|
| 2,873,285 | 2/1959 | Korman | 260—397.45 |
| 2,875,200 | 2/1959 | Hogg et al. | 260—397.45 |

LEWIS GOTTS, Primary Examiner.

ELBERT L. ROBERTS, Assistant Examiner.